United States Patent
Hamlin et al.

(10) Patent No.: US 10,091,191 B2
(45) Date of Patent: Oct. 2, 2018

(54) DISTRIBUTED AUTHORIZATION

(71) Applicant: Dell Products, L.P., Round Rock, TX (US)

(72) Inventors: Daniel L. Hamlin, Round Rock, TX (US); Warren Wade Robbins, Celina, TX (US); Charles D. Robison, Buford, GA (US)

(73) Assignee: Dell Products, L.P., Round Rock, TX (US)

( * ) Notice: Subject to any disclaimer, the term of this patent is extended or adjusted under 35 U.S.C. 154(b) by 224 days.

(21) Appl. No.: 15/096,456

(22) Filed: Apr. 12, 2016

(65) Prior Publication Data
US 2017/0295161 A1    Oct. 12, 2017

(51) Int. Cl.
| | |
|---|---|
| *H04L 9/12* | (2006.01) |
| *H04L 29/06* | (2006.01) |
| *G06F 21/10* | (2013.01) |
| *H04L 9/14* | (2006.01) |
| *H04L 9/30* | (2006.01) |
| *H04L 9/32* | (2006.01) |

(52) U.S. Cl.
CPC ............ *H04L 63/083* (2013.01); *G06F 21/10* (2013.01); *H04L 9/14* (2013.01); *H04L 9/30* (2013.01); *H04L 9/3226* (2013.01); *H04L 63/10* (2013.01); *H04L 63/20* (2013.01)

(58) Field of Classification Search
CPC ....... H04L 63/10; H04L 63/20; H04L 63/083; H04L 9/14; H04L 9/3226; H04L 9/30; G06F 21/10
See application file for complete search history.

(56) References Cited

U.S. PATENT DOCUMENTS

| | | | |
|---|---|---|---|
| 9,026,788 B2 | 5/2015 | Ferg et al. | |
| 9,240,887 B2 * | 1/2016 | Hamlin | ............... H04L 63/0428 |
| 2015/0319171 A1 | 11/2015 | Robison et al. | |

* cited by examiner

*Primary Examiner* — Beemnet Dada
(74) *Attorney, Agent, or Firm* — Fogarty LLP

(57) ABSTRACT

Systems and methods for distributed authorization are described. In some embodiments, an Information Handling System (IHS) may include a processor; and a memory coupled to the processor, the memory having program instructions stored thereon that, upon execution, cause the IHS to: receive a first authentication material from a first device; identify, based upon a policy stored in the IHS, a second device; and distribute a second authentication material to the second device.

14 Claims, 3 Drawing Sheets

DISTRIBUTED AUTHORIZATION

FIELD

This disclosure relates generally to Information Handling Systems (IHSs), and more specifically, to systems and methods for distributed authorization.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

The inventors hereof have recognized that, with the proliferation of user-connected devices, there is a need to provide a seamless method for a user to authenticate in a secure, yet elegant way, any number of connected devices. Currently, however, each connected device must be authenticated individually; thus causing significant delays and low user acceptance.

SUMMARY

Embodiments of systems and methods for distributed authorization are described herein. In an illustrative, non-limiting embodiment, an Information Handling System (IHS) may include a processor and a memory coupled to the processor, the memory having program instructions stored thereon that, upon execution, cause the IHS to: receive a first authentication material from a first device; identify, based upon a policy stored in the IHS, a second device; and distribute a second authentication material to the second device.

For example, the first authentication material may include a first encryption key, and the second authentication material may include a second encryption key distinct from the first encryption key. The distribution of the second authentication material may occur without awareness of the distribution by the first device. Moreover, distribution of the second authentication material may occur in response to a request sent from the second device to the IHS.

In some cases, the memory may have program instructions stored thereon that, upon execution, further cause the IHS to: identify, based upon the policy, a third device; and distribute third authentication material to the third device concurrently with the distribution of the second authentication material to the second device. For example, the first authentication material may include an encryption key, the second authentication material may include a second encryption key distinct from the first encryption key, and the third authentication material may include a third encryption key distinct from the first and second encryption keys.

The second authentication material may be usable by the second device to access a protected resource external to the second device. For instance, the protected resource may include a website. The second authentication material may be usable by the second device to unlock protected content stored locally with respect to the second device.

In various implementations, the second device may comprise an embedded controller coupled to a second processor and an off-host authentication processing system coupled to the embedded controller, wherein the off-host authentication processing system provides a hardware environment segregated from the second processor, wherein the off-host authentication processing system has an off-host processor and an off-host memory coupled to the off-host processor, and wherein the protected content is stored in the off-host memory.

The memory may have program instructions stored thereon that, upon execution, further cause the IHS to: receive an instruction from the first device; and in response to the instruction, revoke the second authentication material from the second device without awareness of the revocation by the first device.

In another illustrative, non-limiting embodiment, a storage device may have program instructions stored thereon that, upon execution by a processor of an IHS, cause the IHS to: receive a first authentication material from a first device; identify, based upon a policy stored in the IHS, a plurality of devices; and distribute each of a plurality of authentication materials to a respective one of the plurality of devices.

In yet another illustrative, non-limiting embodiment, a method in an IHS may include receiving a first authentication material from a first device; identifying, based upon a policy stored in the IHS, a plurality of devices; and distributing each of a plurality of authentication materials to a respective one of the plurality of devices.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods described herein may provide distributed authorization. In various embodiments, these techniques may provide a comprehensive solution which distributes authentication materials to registered devices when a user authenticates to a centralized location and authorizes release of those authentication materials. Particularly, a user authenticates to a central server, referred to as a "credential vault." Upon authentication, any registered device is available for receiving authentication materials stored in the credential vault. Registered devices query the credential vault and, when their respective authentication materials available, the devices may obtain those materials. Upon receipt of its authentication material, each device may process the authentication material to the appropriate resource authorization server (e.g., domain controller, webserver, etc.) and/or to access protected information stored locally. In some cases, credential material may be revoked, invalidated, or removed from devices upon user's sign-out from the credential vault, upon issuance of a revocation command, or the like.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
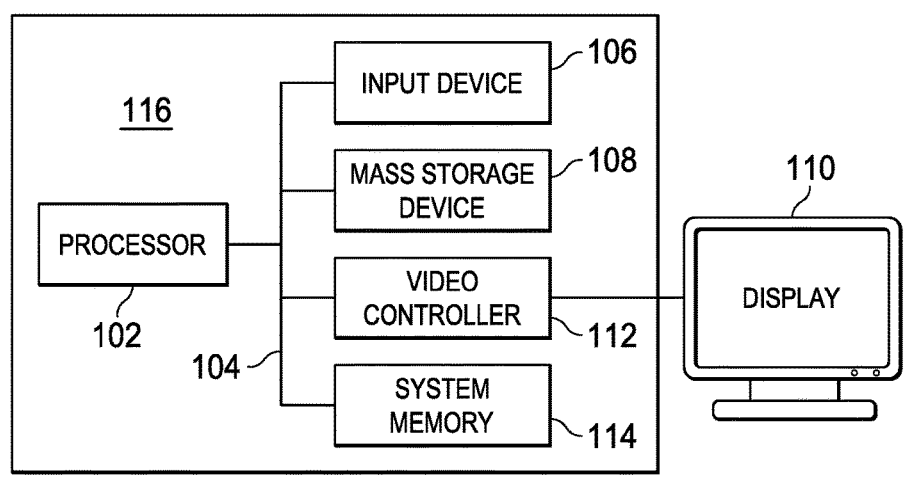
FIG. 1 is a schematic view illustrating an example of an Information Handling System (IHS) according to some embodiments.

FIG. 1 is a schematic view illustrating an example of an IHS according to some embodiments. As shown, IHS 100 includes processor 102, which is connected to bus 104. Bus 104 serves as a connection between processor 102 and other components of IHS 100. Input device 106 is coupled to processor 102 to provide input to processor 102. Examples of input devices may include keyboards, touchscreens, pointing devices such as mice, trackballs, and trackpads, and/or a variety of other such devices. Programs and data are stored on mass storage device 108, which is coupled to processor 102. Examples of mass storage devices may include hard discs, optical disks, magneto-optical discs, solid-state storage devices, and/or a variety other mass storage devices.

IHS 100 further includes display 110, which is coupled to processor 102 by video controller 112. System memory 114 is coupled to processor 102 to provide processor 102 with fast storage to facilitate execution of computer programs. Examples of system memory may include random access memory (RAM) devices such as dynamic RAM (DRAM), synchronous DRAM (SDRAM), solid state memory devices, and/or a variety of other memory devices.

In an embodiment, chassis 116 houses some or all of the components of IHS 100. It should be understood that other buses and intermediate circuits may be deployed between the components described above and processor 102 to facilitate interconnection between those components and processor 102.

Figure 2:
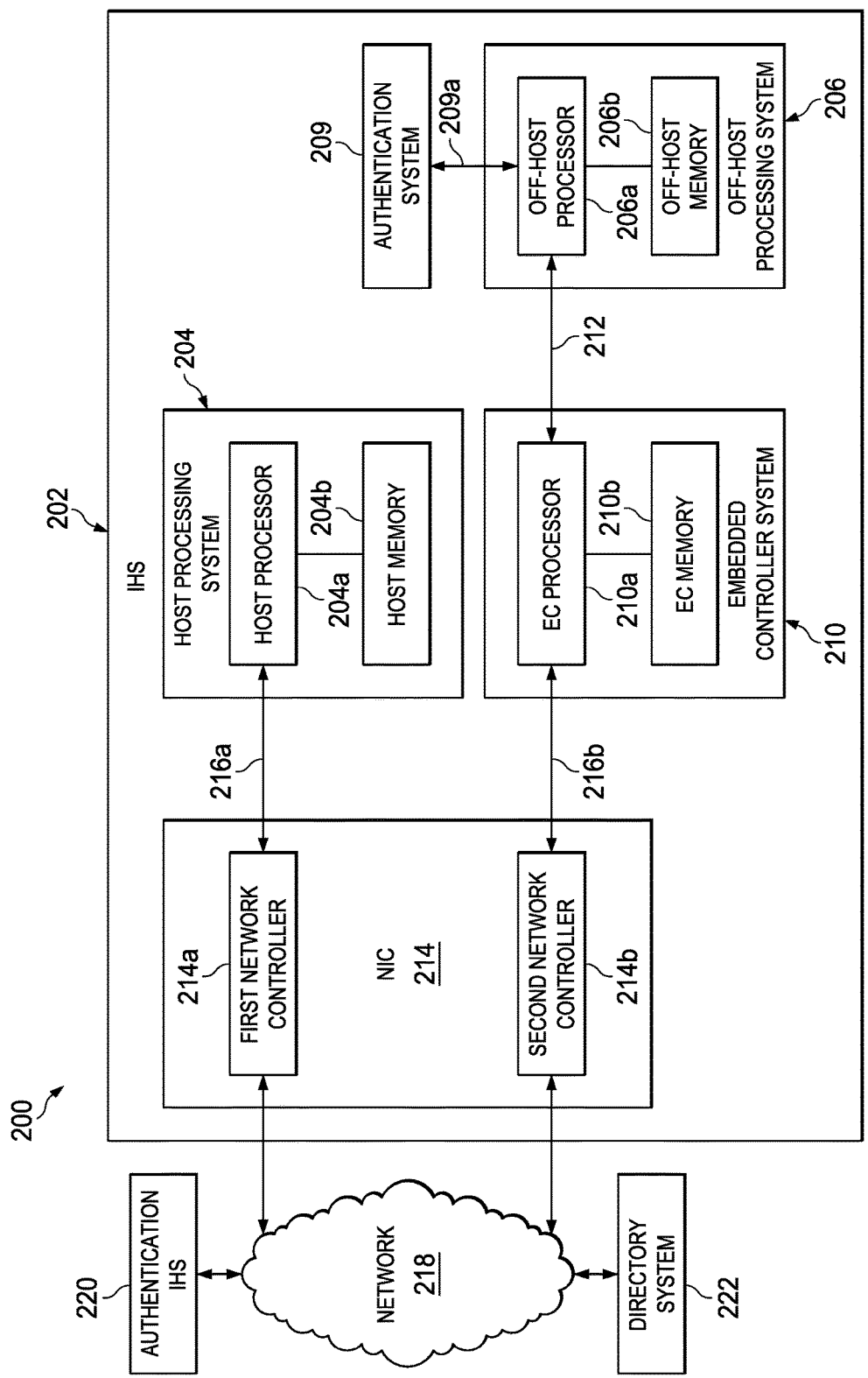
FIG. 2 is a schematic view illustrating an example of an environment where an off-host authentication processing system may be used according to some embodiments.

Referring now to FIG. 2, an embodiment of environment 200 where off-host authentication processing system 206 may be used is illustrated. Environment 200 includes IHS 202, which may be IHS 100 and/or may include some or all of the components of IHS 100. For example, IHS 100 may be a server IHS, a desktop IHS, a laptop/notebook IHS, a tablet IHS, a mobile phone IHS, and/or a variety of other IHSs. IHS 202 comprises host processing system 204, which in turn comprises host processor 204a, host memory 204b, and/or other components.

For example, host processor 204a of host processing system 204 may include processor 102, whereas host memory 204b may include system memory 114. More generally, host processing system 204 may include a variety of processing systems utilized by IHS 202 to perform processing operations related to, for example, executing an Operating System (OS) and/or other software applications.

IHS 202 also comprises embedded controller system 210 that includes embedded controller processor 210a, embedded controller memory 210b, and/or other embedded controller components. For example, embedded controller processor 210a in embedded controller system 210 may include a processor, and embedded controller memory 210b in embedded controller system 210 may include a memory device having instructions that, when executed by embedded controller processor 210a, cause embedded controller processor 210a to perform operations discussed further below.

In the illustrated embodiment, embedded controller processor 210a is coupled to off-host processor 206a via bus 212 such as, for example, a Low-Pin Count (LPC) connection. However, bus 212 may be any variety of physical/logical bus connections that support encrypted communications, including but not limited to, an LPC connection, a USB, a Thunderbolt interface, an $I^2C$, an SPI, a PCI, and/or other bus connections.

IHS 202 also includes network interface controller 214 that provides first network controller 214a, second network controller 214b, and/or other network interface controller components. In some embodiments, network interface controller 214 is compliant with INTEL CORPORATION's Active Management Technology (AMT) and/or "vPro" technology. In an embodiment, first network controller 214a in network interface controller 214 may be segregated, distinct from, and/or otherwise separate from second network controller 214b by assigning to the first network controller 214a a first Media Access Control (MAC) address that is different from a second MAC address that is assigned to the second network controller 214b. In another embodiment, first network controller 214a and second network controller 214b may be segregated from each other in another manner such as, for example, by providing first network controller 214a on a different network interface controller than second network controller 214b.

Host processor 204a of host processing system 204 is coupled to first network controller 214a in network interface controller 214 via bus 216a, and embedded controller processor 210a in embedded controller system 210 is coupled to second network controller 214b in network interface controller 214 via bus 216b. In some embodiments, buses 216a and 216b may be part of the same bus such as, for example, an $I^2C$ connection that couples host processing system 204 and embedded controller system 210 to network interface controller 214. However, bus 214 may be any variety of physical/logical bus connections that support encrypted communications, including but not limited to, $I^2C$, USB, Thunderbolt, SPI, PCI, and/or other bus connections.

Host processor 204a may be configured to only have access to the first network controller 214a by providing host processor 204a a first MAC address that is assigned to first network controller 214a, while embedded controller processor 210a may be configured to only have access to second network controller 214b by providing embedded controller processor 210a a second MAC address that is assigned to second network controller 214b. However, as discussed above, first network controller 214a and second network controller 214b may be provided on different network interface controllers such that buses 216a and 216b are physically separate buses.

IHS 202 is coupled to off-host authentication processing system 206 that includes off-host processor 206a, off-host memory 206b, and/or other off-host processing components. In some cases, off-host authentication processing system 206 may be physically disposed outside of chassis 116—that is, off-host authentication processing system 206 is not a part of IHS 202; and it only coupled to it via bus 212. As used herein, the term "off-host" refers to external off-host authentication processing system 206 being distinct from host processing system 204.

Particularly, off-host processor 206a within off-host authentication processing system 206 may include a secure processor that is segregated, distinct from, and/or otherwise separate from processor 102 in IHS 202, and off-host memory 206b within external off-host authentication processing system 206 may include a memory device that is segregated, distinct from, and/or otherwise separate from system memory 114 in IHS 202 such that off-host memory 206b is accessible by off-host processor 206a but not by host processor 204a. In an example, off-host authentication processing system 206 may be provided, at least in part, using a CONTROLVAULT system that is available from DELL, INC.

Authentication system or device 209 may include, for example, an input device such as a keyboard, a fingerprint reader device or other biometric data reader device, a smart card reader device, an radio frequency identification (RFID) or Near Field Communication (NFC) device that is configured to wirelessly connect to a mobile user device (e.g., a mobile phone), and/or a variety of other authentication devices. Authentication device 209 may be coupled to off-host processor 206 in off-host authentication processing system 206 via USB or Smart Card Interface (SCI) bus 209a. However, bus 209a may be any variety of physical/logical bus connections including but not limited to, USB, SCI, Thunderbolt, I²C, SPI, PCI, and/or other bus connections.

Each of first network controller 214a and second network controller 214b is coupled to network 218 such as, for example, a local area network (LAN), the Internet, and/or a variety of other networks.

Authentication IHS 220 is coupled to network 218. In an embodiment, authentication IHS 220 may be implemented as IHS 100 discussed above with reference to FIG. 1 and/or may include some or all of the components of IHS 100. For example, authentication IHS 220 may be a server IHS or authentication server that may operates to verify user authentication credential inputs and/or verify authentication tokens. In an embodiment, authentication IHS 220 is associated with at least one authentication IHS private key and at least one authentication IHS public key. The at least one authentication IHS private key and the at least one authentication IHS public key may be stored in storage device that is accessible by authentication IHS 220.

In an embodiment, IHS 202 is associated with at least one user IHS private key and at least one user IHS public key. The at least one user IHS private key and the at least one user IHS public key may be stored in storage device that is accessible by off-host authentication processing system 206. For example, the at least one user IHS private key and the at least one user IHS public key may be stored on off-host memory 206b, on host memory 204b, and/or in a variety of other user IHS storage locations. Furthermore, the at least one user IHS public key may be shared with other systems such as, for example, authentication IHS 220.

Directory system 222 is also coupled to network 218. In an embodiment, directory system 222 may include an active directory service available from MICROSOFT CORPORATION. For example, directory system 222 may include an active directory service that is provided on a server IHS and that operates to authenticate and authorize users, assign and enforce security policies, install and update software, and/or perform a variety of other directory system operations.

In an embodiment, network 218, authentication IHS 220, and directory system 222 may be controlled by the same entity. For example, a business or government may provide, house, or otherwise maintain control of each of network 218, authentication IHS 220, and directory system 222 in order to provide an increased level of security using environment 200.

In some embodiments, the system of FIG. 2 may be used to perform out-of-band authentication such that a user must authenticate to off-host authentication processing system 206 in order to access functionality of IHS 202 that is provided by its host processing system 204. The authentication of a user to access the functionality of IHS 202 is controlled by off-host authentication processing system 206, authentication IHS 220, and/or directory system 222 that operate to verify the user and release a token to host processing system 204 that provides the user access to IHS 202.

Particularly, verification of a user may be performed by authentication IHS 220 such that IHS 202 never stores authentication credentials for any user, while authentication tokens are encrypted and exchanged between off-host authentication processing system 206 and authentication IHS 220 such that authentication IHS 220 can send an approval message to directory system 222 to provide for the release of a token to host processing system 204 that allows a user access to IHS 202 if they have been validated. Because host processing system 204 and off-host authentication processing system 206 need not interact in the out-of-band authentication system, host processing system 204 and off-host authentication processing system 206 may be physically segregated (e.g., there may be no communications bus connecting or directly connecting host processing system 204 and external off-host authentication processing system 206) to prevent any access or compromise of host processing system 204 from enabling an unauthorized user to access functionality of IHS 202.

Figure 3:
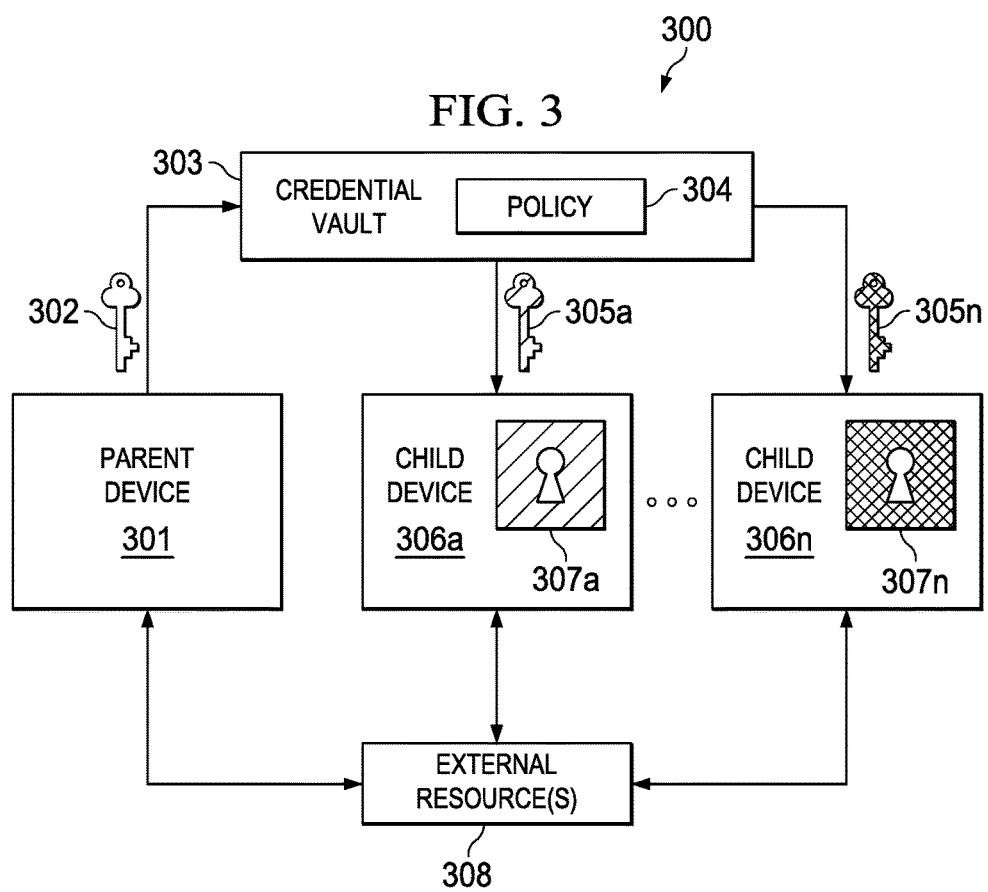
FIG. 3 is a schematic view illustrating an example of an environment where distributed authorization may be used according to some embodiments.

Turning now to FIG. 3, system 300 for distributed authorization is depicted. Each of credential vault 303, parent device 301, child devices 306A-N, and external resource(s) 308 may include at least one IHS such as of IHS 100 of FIG. 1. In some cases, however, parent device 301 and/or child devices 306A-N may be any range of disparate devices (e.g., Internet appliances, etc.). Credential vault 303 may be a distinct entity implemented locally with respect to parent device 301 and child devices 306A-N, or it may be implemented remotely, for example, as part of authentication IHS 220. Moreover, each of parent device 301 and child devices 306A-N may include an off-host authentication processing system such as system 206 described in FIG. 2.

In various embodiments, parent device 301 may be used to authorize or authenticate itself against credential vault 303, for instance, by submitting authentication material 302 to credential vault 303. Generally speaking, credential vault 303 may be a logical shared entity that all devices can access. Examples of authentication material 302 include, but are not limited to, any materials that may be received via authentication system 209—e.g., fingerprints, passwords, passcodes, smartcards, RFID codes or tags, etc. Additionally or alternatively, authentication material 302 may include an encryption key or the like.

After receiving authentication material 302, credential vault 303 may automatically distribute authentication or authorization materials 305A-N to respective one of child devices 306A-N following rules established by policy 304. In some embodiments, authentication material 302 may be of a different type or authentication factor than materials 305A-N. For example, authentication material 302 may be a thumbprint and materials 305A may be a username and password.

In some embodiments, child devices 306A-N may have been pre-registered or otherwise associated with parent device 301 by policy 304 stored in credential vault 303. Policy 304 may be provided, for example, in the form of an XML file or the like listing each of child devices 306A-N and, for each of child devices 306A-N, authentication materials 305A-N to be distributed.

Each of child devices 306A-N may each have protected content 307A-N stored locally with respect to each of device; that is, each of child devices 307A-N may have their own off-host authentication processing system. In some cases, protected content 307A may be different from protected content 307N. Moreover, the protected content may be stored in off-host memory 206b of off-host processing system 206 associated with each child device, such that it remains segregated from that child device's host processing system 204 via embedded controller system 210.

In some embodiments, authentication material 305A may be uniquely usable by child device 306A to retrieve protected content 307A from an off-host memory 206b that is local to child device 306A. Meanwhile, authentication material 305N may be uniquely usable by child device 306N to retrieve protected content 307N from another off-host memory 206b that is local to that child device 306N. Additionally or alternatively, authentication material 305A may be uniquely usable by child device 306A to access protected content (e.g., by logging on) in external resource(s) 308, while authentication material 305N may be uniquely usable by child device 306N to access protected content (e.g., log on) in the same or other external resource(s) 308.

In some cases, some or all authentication materials 305A-N may be distributed to child devices 306A-N, respectively, automatically in a "push" fashion. In other cases, however, some or all authentication material 305A-N may be distributed to child devices 306A-N, respectively, in a "pull" fashion—that is, upon request by each child device 306A-N. In both cases, the distribution of authentication materials 305A-N may be performed automatically and without consent, awareness, or direct instruction from parent device 301 and/or its user.

In various implementations, distribution of authentication materials 305A-N may be performed using an asymmetric encryption scheme of public and private keys between credential vault 303 and each of child devices 306A-N. Each of authentication materials 305A-N may be encrypted with a public key, and each of child devices 306A-N may include a private key usable to decrypt only its respective authentication material 305A-N. In other implementations, a one-time shared key scheme may be used.

For sake of illustration, consider an example were all devices 301 and 306A-N are deployed by a family in a same network. Credential vault 303 may be a stand-alone server IHS or it may be implemented within one of devices 301 and 306A-N. In this example, each of child device(s) 306A-N may have a different media library in the form of protected content 307A-N, respectively, such that each media library is not ordinarily accessible to users of device(s) 306A-N without authentication. Upon authentication or authorization of parent device 301 against credential vault 303, however, each of child device(s) 306A-N may receive its respective authentication material 305A-N from credential vault 303 to unlock its respective library, such that each user of each child device 306A-N can now access its media files.

In another example, each of child devices 306A-N may, in the course of their operations, have to log certain information into a respective local file. The local file may be the protected content 307A-N, such that upon receipt of authentication materials 305A-N, each device 306A-N may then write to that file.

In some embodiments, authentication material 305A-N may be revocable by credential vault 303 upon request by parent device 301, upon expiration of a time period, upon users reaching a predetermined number of accesses of protected material 307A-N, etc. For instance, after having authenticated against credential vault 303, a main user may then "log out" of vault 303, which in turn causes credential vault 303 to send an invalidation or revocation command to each of child devices 306A-N such that protected content 307A-N is no longer accessible using authentication materials 305A-N.

In some cases, policy 304 may be set by a first user (e.g., a system administrator) such that, upon a second user logging into parent device 301 and releasing authentication material 302 to credential vault 303, credential vault 303 then distributes authentication materials 305A-N to third and fourth users of child devices 306A-N.

Figure 4:
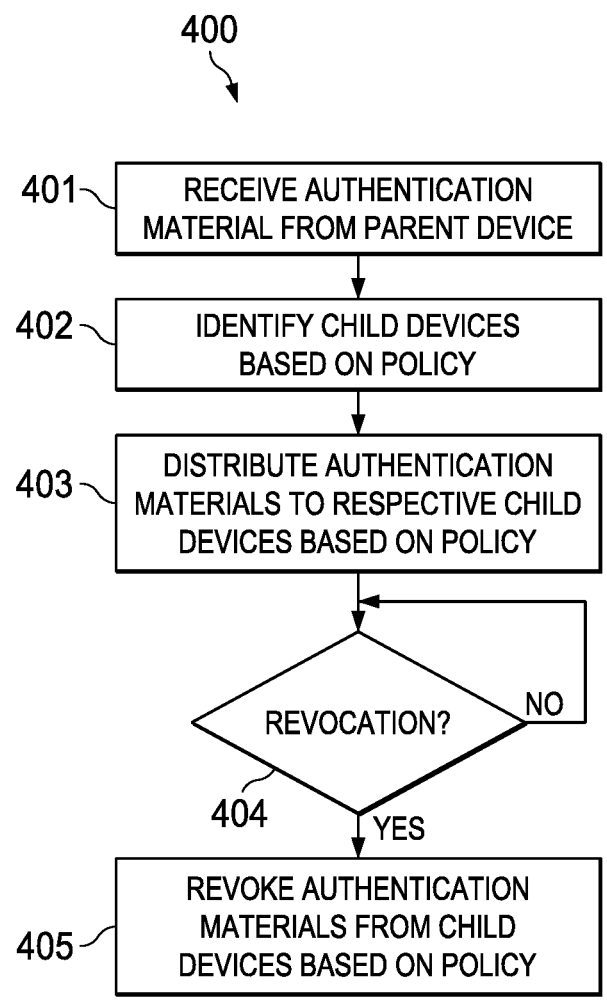
FIG. 4 is a flowchart of an example of a method for distributed authorization according to some embodiments.

FIG. 4 is a flowchart of an example of method 400 for distributed authorization. In some embodiments, method 400 may be performed, at least in part, by credential vault 303 of FIG. 3. As shown, at block 303, method 400 includes receiving authentication material from a parent device. For example, a first user operating parent device 301 may log on to credential vault 303 using a fingerprint or passcode technique—i.e., providing authentication material 302. Then, at block 402, method 400 includes identifying child devices based on a policy. For instance, credential vault 303 may retrieve policy 304 associated with the first user and/or with parent device 301, and policy 304 may list a set of child devices 306A-N pre-configured by a system administrator to receive their respective authentication materials 305A-N.

At block 403, method 400 includes distributing authentication materials to their respective child devices based on the policy. For example, credential vault 303 may determine that one of child devices 306A is configured to automatically receive authentication material 305A, while another one of child devices 306N is expected to request its respective authentication material 305N. In the former case, credential fault 303 may push authentication material 305A (e.g., a key) to child device 306A and may wait for child device 306N to pull authentication material 305N.

In some embodiments, each of child devices 306A-N may include a client application that registers with credential vault 303. In some cases, such a client application may be executed entirely within the segregated environment of off-host authentication processing system 206 of its respective client device. After registration, the client application may be capable of pulling its device's corresponding authentication material.

Upon distribution of authentication materials 305A-N, each of child devices 306A-N may access protected content 307A-N that is locally stored (i.e., within off-host memory 206b) and/or other protected material that is external to that device, for example, within external resource(s) 308.

At block 404, method 400 may determine whether to start a revocation process whereby one or more of authentication materials 305A-N is revoked or otherwise invalidated. For example, after a predetermined amount of time (which may be different for each of child devices 206A-N), credential vault 303 may autonomously commence a revocation process. Additionally or alternatively, the first user operating parent device 301 may log out of credential vault 303 or send a command requesting revocation, thereby initiating the revocation process. Once initiated, block 405 then invalidates or retrieves authentication materials 305A-N from any of child devices 306A-N, for example, based upon policy 304.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive a first authentication material from a first device;
identify, based upon a policy stored in the IHS, a second device and a third device; and
concurrently distribute: (a) second authentication material to the second device, and (b) third authentication material to the third device; wherein the second authentication material is usable by the second device to unlock protected content stored locally with respect to the second device, wherein the second device comprises an embedded controller coupled to a second processor and an off-host authentication processing system coupled to the embedded controller, wherein the off-host authentication processing system provides a hardware environment segregated from the second processor, wherein the off-host authentication processing system has an off-host processor and an off-host memory coupled to the off-host processor, wherein the protected content is stored in the off-host memory, and wherein the third authentication material provides user access to the protected resource at the third device.

2. The IHS of claim 1, wherein the second authentication material includes a second encryption key, and wherein the third authentication material includes a third encryption key distinct from the second encryption key.

3. The IHS of claim 1, wherein user access to the protected resource is granted by the second device in the absence of any communication directed to the first device, and wherein user access to the protected resource is granted by the third device in the absence of any communication directed to the first device.

4. The IHS of claim 1, wherein distribution of the second authentication material occurs in response to a request sent from the second device to the IHS.

5. The IHS of claim 1, wherein the memory has program instructions stored thereon that, upon execution, further cause the IHS to identify, based upon the policy, a type of authentication material associated with the second device and another type of authentication material associated with the third device.

6. The IHS of claim 5, wherein the second authentication material includes a password-based authentication material, and wherein the third authentication material includes a biometric-based authentication material.

7. The IHS of claim 1, wherein the protected resource is external to the second and third devices.

8. The IHS of claim 7, wherein the protected resource includes a website.

9. The IHS of claim 1, wherein the memory has program instructions stored thereon that, upon execution, further cause the IHS to:
- receive an instruction from the first device; and
- in response to the instruction, revoke the second authentication material from the second device without awareness of the revocation by the first device.

10. A hardware storage device having program instructions stored thereon that, upon execution by a processor of an Information Handling System (IHS), cause the IHS to:
- receive a first authentication material from a first device;
- identify, based upon a policy stored in the IHS, a second device and a third device; and
- concurrently distribute: (a) second authentication material to the second device, and (b) third authentication material to the third device; wherein the second authentication material provides user access to a protected resource at the second device, wherein the third authentication material provides user access to another protected resource at the third device, wherein each of the second and third devices comprises an embedded controller coupled to a host processor and an off-host authentication processing system coupled to the embedded controller, wherein the off-host authentication processing system provides a hardware environment segregated from the host processor, wherein the off-host authentication processing system has an off-host processor and an off-host memory coupled to the off-host processor, and wherein the protected resource is stored in the off-host memory.

11. The hardware storage device of claim 10, wherein the second authentication material includes a second encryption key, and wherein the third authentication material includes a third encryption key distinct from the second encryption key.

12. The hardware storage device of claim 10, wherein user access to the protected resource is granted by the second device in the absence of any communication directed to the first device, and wherein user access to the other protected resource is granted by the third device in the absence of any communication directed to the first device.

13. The hardware storage device of claim 10, wherein the authentication materials are usable by the second and third devices to access protected resources external to the second and third devices.

14. In an Information Handling System (IHS), a method comprising:
- receiving a first authentication material from a first device;
- identifying, based upon a policy stored in the IHS, a second device and a third device; and
- concurrently distributing: (a) second authentication material to the second device, and (b) third authentication material to the third device; wherein the second authentication material provides user access to a protected resource at the second device, wherein the third authentication material provides user access to another protected resource at the third device, wherein each of the second and third devices comprises an embedded controller coupled to a host processor and an off-host authentication processing system coupled to the embedded controller, wherein the off-host authentication processing system provides a hardware environment segregated from the host processor, wherein the off-host authentication processing system has an off-host processor and an off-host memory coupled to the off-host processor, and wherein the protected content is stored in the off-host memory.

* * * * *